US007647048B2

(12) United States Patent
Brok et al.

(10) Patent No.: US 7,647,048 B2
(45) Date of Patent: Jan. 12, 2010

(54) SELECTING A HIDDEN NETWORK TO CONNECT A USER TO A WIRELESS LOCAL AREA NETWORK

(75) Inventors: Jacco Brok, Overijssel (NL); Jeroen Van Bemmel, Leiden (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 673 days.

(21) Appl. No.: 11/095,059

(22) Filed: Mar. 31, 2005

(65) Prior Publication Data

US 2006/0227972 A1 Oct. 12, 2006

(51) Int. Cl.
*H04W 4/00* (2009.01)

(52) U.S. Cl. .................. 455/435.2; 455/435.1

(58) Field of Classification Search ............. 455/432.2, 455/455, 552.1, 556.1, 557, 432.1, 432.3, 455/434, 435.1, 435.2, 435.3, 516, 515; 370/328, 370/329, 338, 230, 252
See application file for complete search history.

(56) References Cited

U.S. PATENT DOCUMENTS

| 7,164,912 | B2 * | 1/2007 | Buckley et al. .......... 455/435.2 |
| 7,260,393 | B2 * | 8/2007 | Fnu et al. ................ 455/432.1 |
| 2004/0110530 | A1 * | 6/2004 | Alone et al. ............. 455/552.1 |
| 2004/0219916 | A1 * | 11/2004 | Kim et al. ............... 455/435.3 |
| 2005/0135315 | A1 * | 6/2005 | Sinha ........................ 370/338 |
| 2006/0133330 | A1 * | 6/2006 | Chin .......................... 370/338 |
| 2006/0135068 | A1 * | 6/2006 | Jaakkola et al. .......... 455/41.2 |
| 2006/0217153 | A1 * | 9/2006 | Coles et al. ................ 455/558 |
| 2006/0264227 | A1 * | 11/2006 | Takahashi et al. ......... 455/513 |

OTHER PUBLICATIONS

"Cisco Aironet 1200 Series Access Point"—Cisco Systems, Inc., 1992-2004.
"Key Radius/AAA Considerations for Hotspot Operators"—Funk Software, Inc., Jun. 2004.

* cited by examiner

*Primary Examiner*—George Eng
*Assistant Examiner*—Nam Huynh
(74) *Attorney, Agent, or Firm*—Williams, Morgan & Amerson

(57) ABSTRACT

The present invention provides a method and an apparatus for identifying at least one of one or more hidden and visible networks associated with an access point. The method comprises detecting whether a Wi-Fi network is hidden behind a first visible network of the at least one of one or more hidden and visible networks associated with the access point, and if so, selecting the Wi-Fi network to connect an authorized user to a wireless local area network while retaining an ability to select a second visible network from the at least one of one or more hidden and visible networks. In a client-server based communication system, the Wi-Fi network information of visible access points in a particular range may be automatically retrieved. In addition, by defining a group of networks belonging to an access point, and combining the groups of other access points in the vicinity of the client, a hidden network may be selected without an additional knowledge or processing by the authorized user. This may enable network operators or service providers to reorganize the Wi-Fi network infrastructure as desired and may enable authorized users or client software to detect and select a hidden network, regardless of organization of networks in the vicinity of the client.

15 Claims, 5 Drawing Sheets

SELECTING A HIDDEN NETWORK TO CONNECT A USER TO A WIRELESS LOCAL AREA NETWORK

1. FIELD OF THE INVENTION

This invention relates generally to telecommunications, and more particularly, to wireless communications.

2. DESCRIPTION OF THE RELATED ART

As computing or communication network users become increasingly mobile, wireless usage and capabilities may grow to provide wireless services flexibly and cost effectively by connecting these users to data networks inside or outside of their work or living place. The data networks may wirelessly communicate mobile data at a speed and coverage desired by individual users or enterprises. For example, use of wireless communication devices, such as mobile phones, laptops and Personal Digital Assistants (PDAs) enable users to access public, private or enterprise networks practically everywhere through a wireless local area network (WLAN).

Generally, a wireless LAN includes a wireless access point (AP) that communicates with a network adapter to extend a wired LAN. A user with a Wi-Fi compliant wireless communication device may use any type of access point with any other brand of client hardware that also is based on the IEEE 802.11 standard. Typically, however, any Wi-Fi compliant wireless communication device using the same radio frequency (RF) signal, for example, 2.4 GHz for 802.11b or 11 g, 5 GHz for 802.11a may work with any other wireless communication device, even if not a Wi-Fi compliant wireless communication device. The term Wi-Fi, short for wireless fidelity is promulgated by the Wi-Fi Alliance to refer any type of the IEEE 802.11 standard based device or network, whether 802.11a, 802.11b, 802.11g, dual-band, and the like. The Wi-Fi Alliance is an industry alliance to promote wireless networking arrangements according to the IEEE 802.11 specification.

A variety of Wi-Fi access points (APs) support the provisioning of multiple virtual networks, identified by a service set identifier (SSID), which is a unique label that distinguishes one WLAN from another. Wireless communication devices generally use the SSID to establish and maintain connectivity. As part of the association process, a wireless network interface card (NIC) should have the same SSID as the access point. An SSID may contain up to 32 alphanumeric characters, which are usually case sensitive. Conventional access points may only support a single SSID. Each SSID may be broadcast or hidden. A broadcast SSID allows a mobile terminal with a Wi-Fi receiver ("client") to detect and identify that network. However, the other, hidden networks may be detected but not identified by clients. Therefore, without prior knowledge of the existence of an additional, hidden Wi-Fi network, clients cannot use it.

While a hidden network may be known by a client, i.e., a user or owner of a mobile terminal with a Wi-Fi receiver, it is not possible to connect to a hidden network with the Wi-Fi client software, such as available with Microsoft® Windows™ XP Operating System without additional recurring manual steps performed by the user. The Wi-Fi client software may allow the client to connect to "visible" networks, i.e., with broadcasted SSIDs, but not to unidentified hidden networks, such as hidden Wi-Fi networks hidden behind a visible network for any given access point.

Some Wi-Fi client software relies on the knowledge of the user and allows the user to define the SSID of a hidden network. However, for the Wi-Fi client software, such as available with Microsoft® Windows™ XP Operating System, a user is expected to manually add the hidden network and remove the visible network from a list. Other Wi-Fi client software may have a pre-defined local definition of hidden networks, which runs a risk of getting outdated. Nonetheless, a user is expected to have prior knowledge of the existence of hidden networks. In some mobile or wireless communication environments, this approach may provide a security feature, albeit a cumbersome one.

However, above set forth approaches may be unacceptable for most public Wi-Fi hotspots because even with a prior knowledge of a visible network, conflicts may occur when both visible and hidden network are defined at the client device. A public Wi-Fi hotspot generally corresponds to a single point within a cell or a sector where a relatively large number of users gather in a relatively small area, for example, an audience gathered in an auditorium or a cafe. A conflict may be prevented by removing—and hence losing—the definition of the visible network. One drawback of such client-based provisioning solutions is that they constantly require manual updates.

The present invention is directed to overcoming, or at least reducing, the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for identifying at least one of one or more hidden and visible networks associated with an access point. The method comprises detecting whether a Wi-Fi network is hidden behind a first visible network of the at least one of one or more hidden and visible networks associated with the access point, and if so, selecting the Wi-Fi network to connect an authorized user to a wireless local area network while retaining an ability to select a second visible network from the at least one of one or more hidden and visible networks.

In another embodiment, a client-server based communication system associated with a network comprises a client including a storage and a server. The storage may store instructions for identifying a Wi-Fi network associated with an access point to detect whether the Wi-Fi network is hidden behind a first visible network of at least one of one or more hidden and visible networks associated with the access point. And if so, select the Wi-Fi network to connect an authorized user to a wireless local area network while retaining an ability to select a second visible network of the at least one of one or more hidden and visible networks in a mobile environment including a multiplicity of access points that supports the Wi-Fi network and the at least one of one or more hidden and visible networks. The server may be adapted to automatically provide to the client, information, in response to a request for the information by the authorized user, for the Wi-Fi network, on one or more visible access points of the multiplicity of access points within a range without informing the authorized user of the client about organization or configuration of said network or the access point in advance.

In yet another embodiment, a client associated with a network in a client-server based communication system comprises a controller and a storage coupled to the controller. The storage stores instructions for identifying a Wi-Fi network associated with an access point to detect whether the Wi-Fi network is hidden behind a first visible network of at least one of one or more hidden and visible networks associated with the access point. And if so, select the Wi-Fi network to connect an authorized user to a wireless local area network while retaining an ability to select a second visible network of the at least one of one or more hidden and visible networks in a mobile environment including a multiplicity of access points that supports the Wi-Fi network and the at least one of one or more hidden and visible networks.

In still another embodiment, a server associated with a network in a client-server based communication system comprises a controller and a storage coupled to the controller. The storage stores instructions for automatically providing to a client, information, in response to a request for the information by an authorized user, for a Wi-Fi network associated with an access point such that the Wi-Fi network hides behind a first visible network of at least one of one or more hidden and visible networks associated with the access point, on one or more visible access points of a multiplicity of access points within a range without informing the authorized user of the client about organization or configuration of the network or the access point in advance. This enables the authorized user to connect to a wireless local area network while leaving an ability for said client to select a second visible network of the at least one of one or more hidden and visible networks in a mobile environment including a multiplicity of access points that supports the Wi-Fi network and the at least one of one or more hidden and visible networks.

In one further embodiment, an article comprising a computer readable storage medium storing instructions that, when executed cause a client-server based communication system to identify a network associated with an access point to connect an authorized user to a wireless local area network for detecting whether a Wi-Fi network is hidden behind a first visible network of at least one of one or more hidden and visible networks associated with the access point. And if so, to select the Wi-Fi network to connect the authorized user to while retaining an ability to select a second visible network from the at least one of one or more hidden and visible networks.

In another exemplary embodiment, an apparatus is provided for identifying a network associated with an access point to connect an authorized user to a wireless local area network. The apparatus comprises means for detecting whether a Wi-Fi network is hidden behind a first visible network of at least one of one or more hidden and visible networks associated with the access point, and means for, selecting the Wi-Fi network, if so, to connect the authorized user to while retaining an ability to select a second visible network from the at least one of one or more hidden and visible networks.

BRIEF DESCRIPTION OF THE DRAWINGS

The invention may be understood by reference to the following description taken in conjunction with the accompanying drawings, in which like reference numerals identify like elements, and in which.

Figure 1:
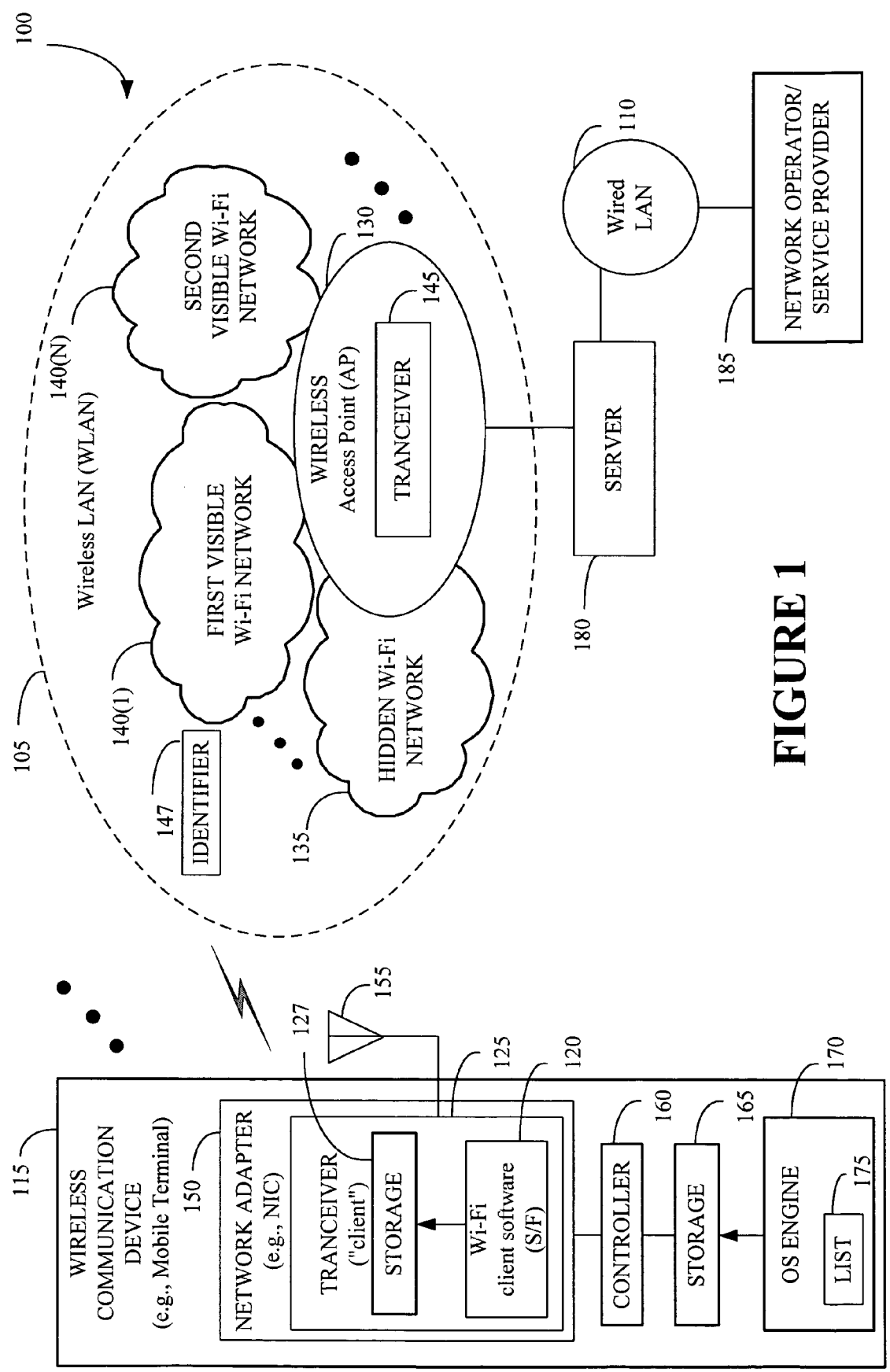
FIG. 1 schematically depicts a block diagram of a client-server based communication system associated with a network, such as a wireless local area network coupled to a wired local area network for connecting an authorized user of a wireless communication device having a Wi-Fi client software and a transceiver, i.e., "client" to the wireless local area network, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a system and a method of detecting and identifying one or more hidden Wi-Fi networks is provided for authorized users. By selecting a Wi-Fi network, an authorized user may be connected to a hidden network, such as a hidden Wi-Fi network while retaining an ability of selecting other, visible one or more networks. The Wi-Fi network information of all visible access points in a particular range may be automatically retrieved such that neither the authorized user nor a client at the authorized user may need to know the network or access point organization or configuration in advance, and configuration updates may be easily distributed. In addition, by defining a group of networks belonging to an access point, and combining the groups of other access points in the vicinity of the client, a hidden network may be selected without an additional knowledge or processing by the authorized user. A client-server based communication system may enable network administrators to reorganize the Wi-Fi network infrastructure as desired. The client-server based communication system may enable authorized users or client software to detect and select a hidden network, regardless of organization of networks in the vicinity of the client.

Referring to FIG. 1, a client-server based communication system 100 is schematically depicted to be associated with a network, such as a wireless local area network (WLAN 105 coupled to a wired local area network (LAN) 110, in accordance with one embodiment of the present invention. For connecting to the wireless LAN 105, for example, to provide a wireless service to an authorized user, a wireless communication device 115 includes a transceiver, i.e., "client" 125 having a Wi-Fi client software (S/F) 120. In one embodiment, the transceiver, i.e., "client" 125 may comprise a storage 127 to store the Wi-Fi client S/F 120.

Essentially, the Wi-Fi client S/F 120 may identify a network associated with an access point and detect whether or not this network is hidden before connecting an authorized user to the wireless LAN 105. Accordingly, the client-server based communication system 100 may enable authorized users or client software, such as the Wi-Fi client S/F 120 to detect and select a hidden network, regardless of organization of networks in the vicinity of the transceiver, i.e., "client" 125 of the wireless communication device 115.

In the client-server based communication system 100, a logical Wi-Fi network may be identified by a SSID according to one embodiment of the present invention. However, the logical Wi-Fi network may be detectable or undetectable and visible or not visible, i.e., ("hidden"). A visible network is automatically detectable; however, a hidden network may or may not be detectable depending on the presence of at least one visible network at the same access point because the SSID is not broadcast in beacon frames as is the case for the visible network. Therefore, hidden networks may or may not be detectable by the client 125. That is, for a detectable hidden network, the client 125 may notice a beacon frame broadcast with an empty SSID (for example, either a length being set to "0" or a space (' ') is used)). The undetectable hidden network called "an obscured network," i.e., hidden and not at all detectable may not be usable without additional provisioning information.

Consistent with one embodiment, the client-server based communication system 100 may enable use of the available, allowed SSIDs (specific for a given user) at a given access point for a multiplicity of logical Wi-Fi networks including visible, hidden and/or obscured networks. Moreover, the client-server based communication system 100 may provide additional provisioning parameters to use with each SSID.

Examples of the client-server based communication system 100 of FIG. 1 include a system based on a Universal Mobile Telecommunication System (UMTS) protocol, although it should be understood that the present invention may be applicable to other systems or protocols that support multi-media, data, optical, and/or voice communication. For instance, protocols like Code Domain Multiple Access (CDMA2000) or short range protocols, such as Bluetooth™ may be used. That is, it should be understood, however, that the configuration of the client-server based communication system 100 of FIG. 1 is exemplary in nature, and that fewer or additional components may be employed in other embodiments of the client-server based communication system 100 without departing from the spirit and scope of the instant invention.

In one embodiment, the wireless LAN 105 may comprise at least one of one or more hidden and visible networks associated with a wireless access point (AP) 130. For example, a Wi-Fi network 135, a first and a second visible Wi-Fi networks 140(1-N) may be associated with the wireless AP 130 in a mobile environment including a multiplicity of access points that supports the Wi-Fi network 135 and the first and second visible Wi-Fi networks 140(1-N).

Consistent with one embodiment of the instant application, the Wi-Fi network 135 may be based on a wireless network protocol that uses unregulated spectrum for establishing a network connection, and is often used for connecting a user to the wireless WLAN 105 that may communicate high-speed multimedia information including voice, data, and video content. The Wi-Fi network 135 may be hidden behind the first visible Wi-Fi network 140(1), i.e., the Wi-Fi network 135 may be detected but not identified by the transceiver, "client" 125 of the wireless communication device 115. Instead, identity of the first and second visible Wi-Fi networks 140(1-N) may be known to the wireless communication device 115. That is, the wireless communication device 115 may detect and identify the first and second visible Wi-Fi networks 140 (1-N).

The wired LAN 110 may comprise one or more data networks, such an Internet Protocol (IP) network comprising the Internet and a public telephone system (PSTN). The wireless AP 130 may comprise a transceiver 145 having a RJ-45, serial or other connections to link to the wired LAN 110 based on a Simple Network Management Protocol (SNMP), for example.

The wireless AP 130, such as a Wi-Fi access point may support the provisioning of multiple virtual networks, identified by a public visible service set identifier (SSID), which is a unique label that distinguishes one WLAN from another. An identifier 147, such as the SSID of the wireless AP 130 for distinguishing the wireless LAN 105 from other WLANs may comprise alphanumeric characters, for example, up to 32 alphanumeric characters that may be case sensitive. The wireless communication device 115 may use the identifier 147 to establish and maintain connectivity with the wireless LAN 105.

The wireless communication device 115 may take the form of any of a variety of devices, such as mobile terminals including cellular phones, personal digital assistants (PDAs), laptop computers, digital pagers, wireless cards, and any other device capable of accessing the wireless LAN 105. The wireless communication device 115 may further comprise a network adapter 150, such as a Network Interface Card (NIC) that includes the transceiver, i.e., "client" 125 with an antenna 155. Examples of the network adapter 150 include a communication or PC card for a portable device, such as a laptop computer or an internal card for a computer, such as a desktop computer. As part of the association process, the network adapter 150, e.g., a wireless NIC uses the same SSID, i.e., identifier 147 as that of the wireless AP 130.

The wireless communication device 115 may further comprise a controller 160 and a storage 165 storing an operating system (OS) engine 170 for controlling and processing wireless communications to and from the transceiver, i.e., "client" 125. To connect to the Wi-Fi network 135 hidden from the hidden and/or visible networks, the wireless communication device 115 may use the Wi-Fi client S/F 120 of the OS engine 170 for obtaining the identifier 147 associated with the Wi-Fi network 135. The OS engine 170 may maintain a list 175, for example, a preferred list of the hidden and/or visible networks. Based on one or more definition parameters, the Wi-Fi client S/F 120 may define a single hidden network in the list 175 from the hidden and/or visible networks.

The client-server based communication system 100 may include a server 180 that couples the wireless LAN 105 to the wired LAN 110 for enabling one or more network operator(s)/service provider(s) 185 to provide a wireless service, such as a Wi-Fi wireless service to an authorized user of the wireless communication device 115. Using the server 180, in one embodiment, the network operator(s)/service provider(s) 185 may competitively provide a host of wireless services, such as public Wi-Fi services with high speed connections that many enterprise users desire on a public wireless LAN for a remote access.

To this end, the server 180 may be adapted to automatically provide to the transceiver, "client" 125, information, in response to a request for the information by the authorized user, for the Wi-Fi network 135. However, it is to be understood that any other suitable way and/or means of information exchange may be deployed depending upon a particular application, without limiting the scope of the instant invention. This information may relate to one or more visible access points of the multiplicity of access points within a range.

Figure 2:
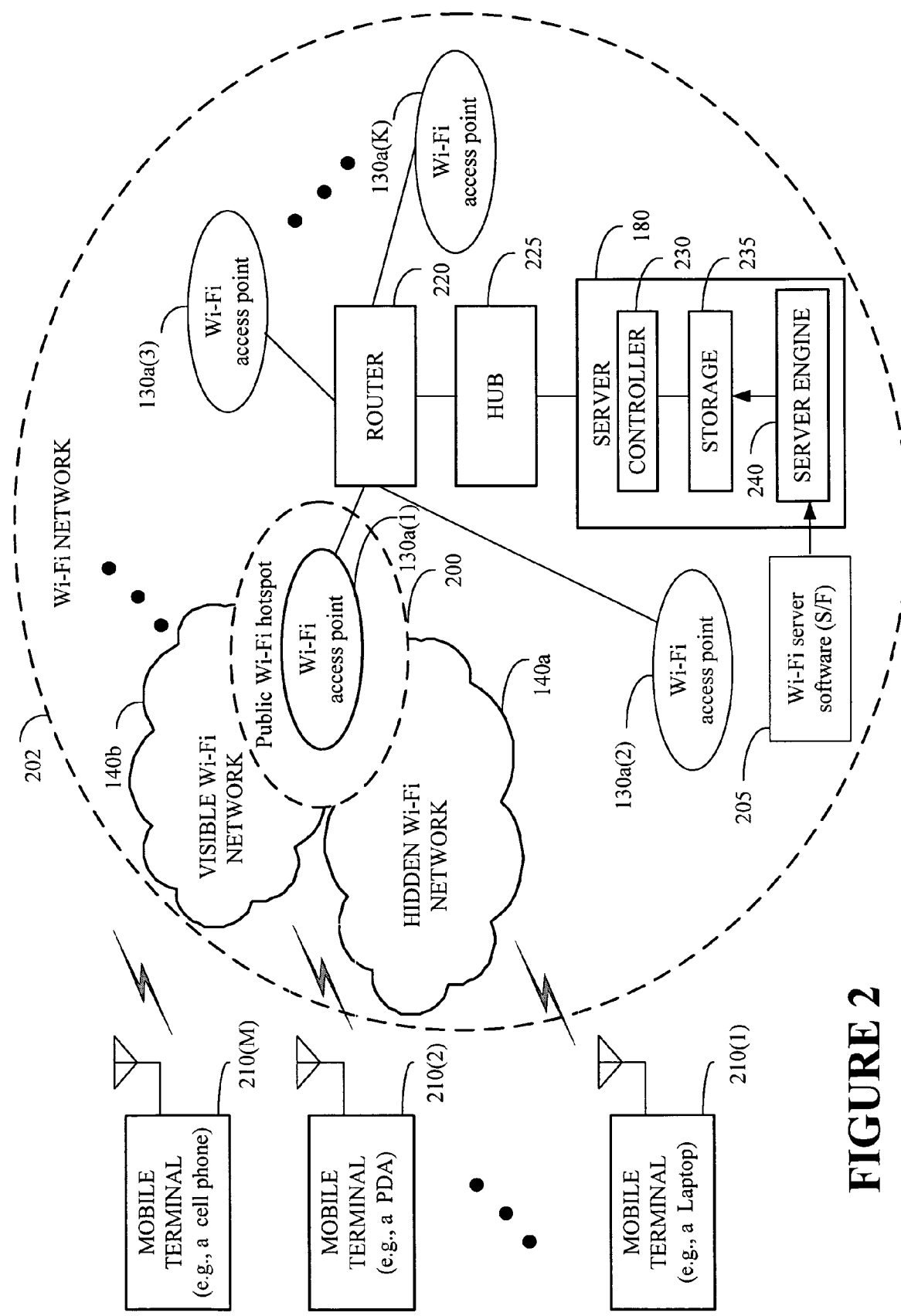
FIG. 2 schematically depicts one embodiment of the inter-operation of the various components of the client-server based communication system shown in FIG. 1 for connecting the authorized user to a public Wi-Fi hotspot of the wireless local area network where the Wi-Fi client software interacts with a Wi-Fi server software that allows the client to select a network hidden behind other networks.

As shown, FIG. 2 schematically depicts one embodiment of the interoperation of the various components of the client-server based communication system 100 shown in FIG. 1 for connecting the authorized user to a public Wi-Fi hotspot 200 on the wireless LAN 105 of different private or public hidden Wi-Fi networks 140a and/or visible Wi-Fi networks 140b associated with a first Wi-Fi access point 130a of a plurality of Wi-Fi access point 130a (1-K) within a Wi-Fi network 202. The Wi-Fi client S/F 120 interacts with a Wi-Fi server software (S/F) 205, allowing the transceiver, "client" 125 to select a network, i.e., the Wi-Fi network 135 hidden behind other networks, for example, the first visible Wi-Fi network 140(1). In one embodiment, the public Wi-Fi hotspot 200 refers to a single point within a cell or a sector where a relatively large number of users of a multiplicity of mobile terminals 210(1-M) may gather in a relatively small area, for example, an audience gathered in an auditorium or a cafe.

The plurality of Wi-Fi access point 130a (1-K) of the Wi-Fi network 202 may couple to a conventional wireless router 220, which in turn, couples the server 180 via a conventional wireless hub 225. As illustrated in FIG. 2, the server 180 may comprise a controller 230 coupled to a storage 235 for storing a server engine 240. In one embodiment, the server engine 240 may comprise the Wi-Fi server S/F 205 for providing one or more Wi-Fi access services to authorized users of the mobile terminals 210(1-M). The Wi-Fi server S/F 205 may cooperatively interact with the Wi-Fi client S/F 120 of a mobile terminal 210 to provision a Wi-Fi access service at the public Wi-Fi hotspot 200, avoiding conflicts between the different private or public hidden Wi-Fi networks 140a and/or visible Wi-Fi networks 140b even in absence of prior knowledge of the existence of one or more hidden networks.

In operation, an authorized user may use the mobile terminal 210(1), e.g., a laptop computer with a built-in wireless LAN access device, such as the network adapter 150 to connect to the public Wi-Fi hotspot 200 using a Wi-Fi access service. In this way, Wi-Fi compliant mobile terminals 210 (1-M), such as laptops, PDAs, or cell phones may obtain high-rate data services at hotels, airports, cafes, and other public sites. A public Wi-Fi operator or a mobile service provider may offer either on the spot Wi-Fi access service or have subscribers use that service through the public Wi-Fi hotspot 200 on wireless and wired networks. Many Wi-Fi network operators or mobile service providers may compete for these types of Wi-Fi access services on the wireless LAN 105, i.e., a public and/or private wireless LANs depending upon a particular Wi-Fi hotspot location.

Figure 3:
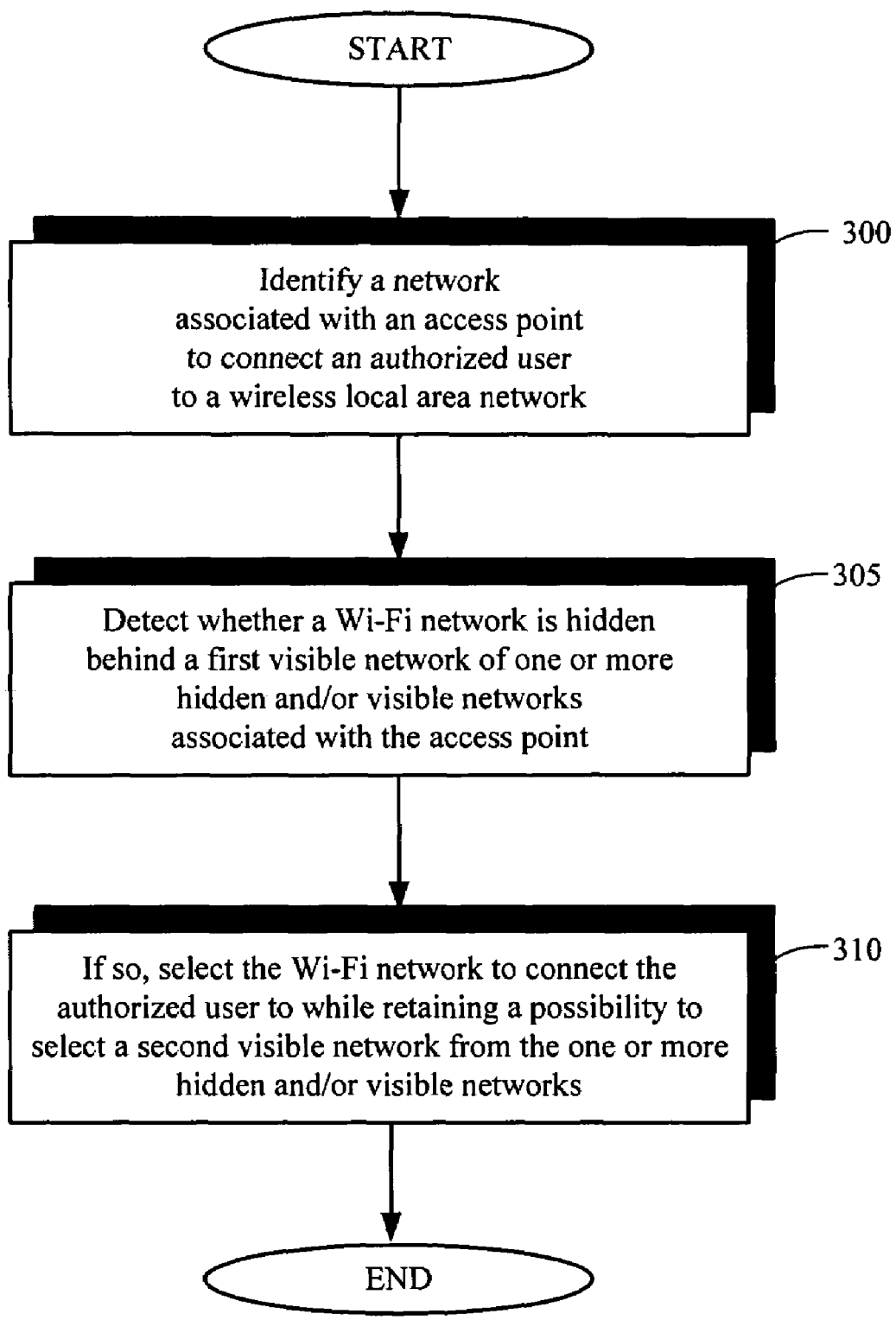
FIG. 3 illustrates a stylized representation of a flow chart implementing a method for identifying a network associated with an access point to detect whether a Wi-Fi network is hidden, if so, selecting the Wi-Fi network to connect the authorized user to the wireless local area network, for example, when rendering a Wi-Fi access service consistent with one embodiment of the present invention.

Turning now to FIG. 3, a stylized representation of a flow chart implementing a method is illustrated for identifying the Wi-Fi network 135 associated with the wireless AP 130 to detect whether the Wi-Fi network 135 is hidden, and if so, selecting the Wi-Fi network 135 to connect the authorized user to the wireless LAN 105, for example, when providing a Wi-Fi access service. At block 300, the Wi-Fi client S/F 120 may identify the Wi-Fi network 135 to connect the authorized user to the wireless LAN 105. In operation, the Wi-Fi client S/F 120 may use instructions for identifying a Wi-Fi network, such as the Wi-Fi network 135 associated with the wireless AP 130.

As indicated in block 305, the Wi-Fi client S/F 120 may detect whether the Wi-Fi network 135 is hidden behind the first visible Wi-Fi network 140(1). Specifically, the wireless communication device 115 may be able to detect whether the Wi-Fi network 135 is hidden behind the first visible Wi-Fi network 140(1) of at least one of one or more hidden and visible networks associated with the wireless AP 130. If the Wi-Fi client S/F 120 determines that the Wi-Fi network 135 is a hidden network, the Wi-Fi network 135 may be selected to connect the authorized user to the wireless LAN 105 while retaining an ability to select the second visible Wi-Fi network 140(N) from the one or more hidden and/or visible networks that may be associated with the wireless AP 130.

In this manner, the wireless LAN 105, such as a Wi-Fi wireless LAN may provide an affordable way for home networking solutions to multiple computers that share peripherals like printers and files across a platform. Within an enterprise, for example, a Wi-Fi wireless LAN may save cabling and labor costs while significantly improving employee productivity. Thus, Wi-Fi wireless LANs may satisfy the demands of mobile users or employees within an enterprise location, or in homes where there are multiple computers. The IEEE 802.11 standard is the basis for Wi-Fi wireless LANs connecting different private or public Wi-Fi networks. The IEEE 802.11 standard specifies higher rate services (802.11a and g), quality of service mechanisms (802.11e), and enhanced security procedures (802.11i) for a Wi-Fi network private or otherwise public deployed to provide coverage to an enterprise user in buildings and campuses.

Figure 4:
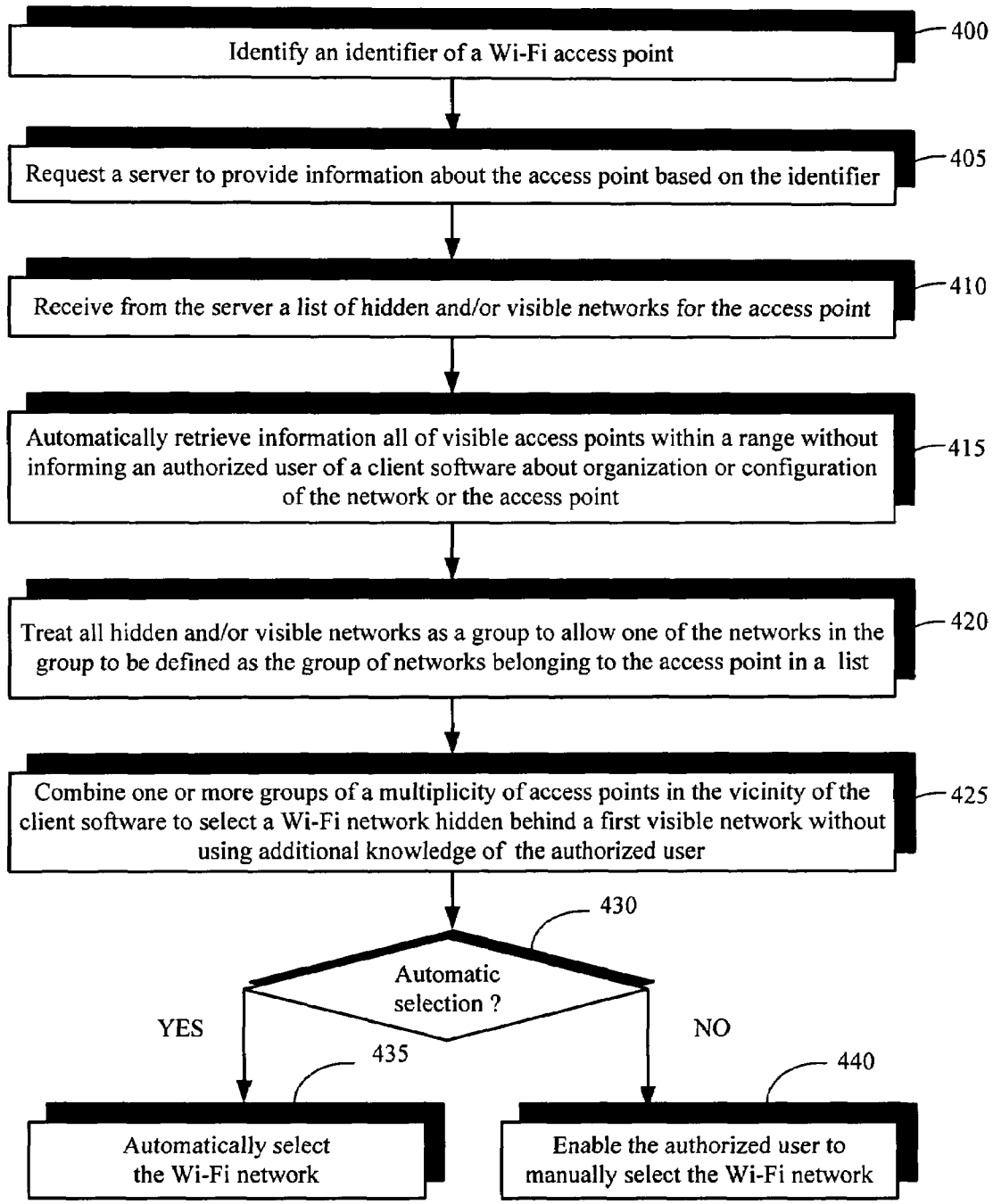
FIG. 4 is a flow diagram illustrating one embodiment of a strategy employed in the client-server based communication system of FIGS. 1-2 for either automatically selecting the Wi-Fi network or enabling the authorized user to manually perform the selection thereof.

Consistent with one embodiment of the present invention, FIG. 4 illustrates one embodiment of a strategy employed in the client-server based communication system 100 shown in FIGS. 1-2 for either automatically selecting the Wi-Fi network 135 or enabling an authorized user to manually perform the selection thereof. At block 400, the Wi-Fi client S/F 120 may identify the identifier 147 of the wireless AP 130 shown in FIG. 1, such as the Wi-Fi access point 130(1) shown in FIG. 2. At block 405, the transceiver, "client" 125 may request the server 180 to provide information about the wireless AP 130 based on the identifier 147. That is, the wireless communication device 115 may use the Wi-Fi client S/F 120 of the OS engine 170 for receiving from the server 180 the list 175, for example, a preferred list of the hidden and/or visible networks associated with the wireless AP 130, as set forth in block 410.

At block 415, from the server 180, the Wi-Fi client S/F 120 may automatically retrieve the information on the one or more visible access points, e.g., all of visible access points within a range without informing the authorized user of the transceiver, "client" 125 about organization or configuration of the wireless LAN 105 or the wireless AP 130 in advance.

Instead of using a single central server, such as the server 180, other embodiments may use a local server on the wireless LAN 105, for example, on a public SSID according to a desired convention, or use an automatically discovered server for obtaining provisioning information. Alternatively, this functionality may also be implemented in the wireless AP 130 itself. However, in one embodiment of the present invention, only authorized users may retrieve such information.

At block 420, the Wi-Fi client S/F 120 may treat at least one of one or more hidden and visible networks as a group for the purposes of allowing at least one of the hidden and/or visible networks in the group to be defined in the list 175 maintained by the OS engine 170. The transceiver, "client" 125 may combine one or more groups of a multiplicity of access points in the vicinity of the Wi-Fi client S/F 120 to select the Wi-Fi network 135 hidden behind the first visible Wi-Fi network 140(1) without using additional knowledge of the authorized user, in block 425.

A decision block 430 may ascertain whether or not an automatic selection of the Wi-Fi network 135 is desired, indicated or to be performed at the wireless client device 115. In response to detecting the Wi-Fi network 135 and an indication of automatic selection at the decision point 430, at block 435, the Wi-Fi client S/F 120 may automatically select the Wi-Fi network 135 to connect the authorized user to the wireless LAN 105 in the mobile environment of the client-server based communication system 100. Otherwise, as shown in block 440, in response to detecting the Wi-Fi network 135 and absent an indication of automatic selection at the decision point 430, the authorized user may be enabled to manually select the Wi-Fi network 135 to connect to in the mobile environment.

Figure 5:
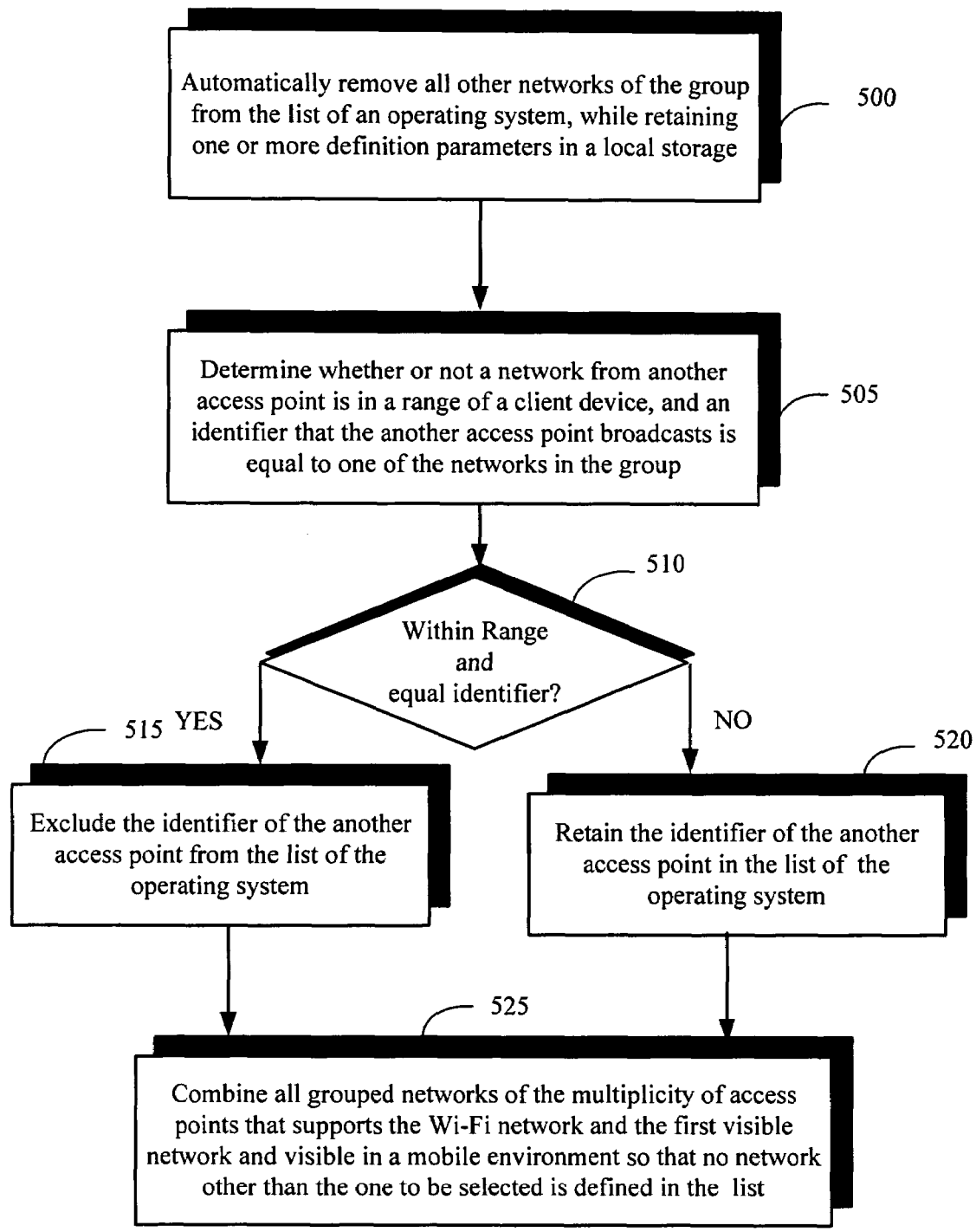
FIG. 5 is a flow diagram illustrating one embodiment of a strategy employed in the client-server based communication system of FIGS. 1-2 for combining all grouped networks of a multiplicity of access points that supports the Wi-Fi network and a first visible network and visible in a mobile environment to assure that no network other than the one to be selected is defined in a preferred list of an operating system engine.

According to one exemplary embodiment of the instant invention, FIG. 5 illustrates a strategy employed in the client-server based communication system 100 of FIGS. 1-2 for combining all grouped networks of a multiplicity of access points that supports the Wi-Fi network 135 and the first visible Wi-Fi network 140(1) and visible in a mobile environment. This strategy may ensure that no network other than the one to be selected is defined in the list 175, e.g., a preferred list of the OS engine 170 of the wireless communication device 115.

At block 500, the Wi-Fi client S/F 120 may automatically remove all other networks of the group from the list 175 of the OS engine 170, while retaining one or more definition parameters in a local storage. The Wi-Fi client S/F 120 may determine whether or not a network from another access point than the wireless AP 130 is within a range of the transceiver, "client" 125, and an identifier that the another access point broadcasts is equal to one of the networks in the group, as illustrated in block 505.

A check at a decision block 510 may indicate that whether or not a network from another access point than the wireless AP 130 is within a range of the transceiver, "client" 125 and that the broadcasted identifier is equal to one of the networks in the group. If both the conditions of the check at the decision block 510 are met, the Wi-Fi client S/F 120 may exclude that identifier of the other access point from the list 175 of the OS engine 170. Conversely, the Wi-Fi client S/F 120 may retain that identifier of the other access point in the list 175 of the OS engine 170, as depicted in block 520. In this manner, at block 525, all grouped networks of the multiplicity of access points that supports the Wi-Fi network 135 and the first visible Wi-Fi network 140(1) and visible in the mobile environment of the client-server based communication system 100 may be combined so that no network other than the one to be selected is defined in the list 175.

When the Wi-Fi client S/F 120 detects a Wi-Fi network, i.e., the Wi-Fi network 135, the Wi-Fi client S/F 120 also obtains the identifier 147 of the wireless AP 130, commonly denoted as a broadcasted SSID. However, this ability of both detection and obtaining of the identifier 147 is independent of broadcasted or hidden SSIDs. Using the broadcasted SSID, the transceiver, i.e., "client" 125 requests the server 180 that may be located at a central entity—at a network operator or a service provider—to provide information about the wireless AP 130. The server 180 responds with a list of all networks that the wireless AP 130 provides, containing additional information such as characteristics (hidden/visible) and authentication requirements. Upon reception of the response, the transceiver, i.e., "client" 125 has obtained knowledge of both visible and hidden networks. Based on parameters not described here, the transceiver, i.e., "client" 125 (automatically) or the authorized user (manually) may select a Wi-Fi network to use.

Thus, the Wi-Fi client S/F 120 or the authorized user may obtain the SSID of a hidden network to connect to the hidden network with the Wi-Fi client S/F 120 of Microsoft® Windows™ XP, by only defining a single hidden network in the list 135, e.g., a preferred list (maintained by Windows®). Hence, the definitions of the visible network and any other hidden networks belonging to the same access point may be removed without using knowledge from the authorized user on both network organization and client behavior. The visible and/or hidden networks may be regarded as a group, allowing only one of the networks in the group to be defined in the preferred list of the Microsoft® Windows™ XP client software. Upon selection (i.e., usage or connection) of one of the networks of a group, all other networks of that group may be automatically removed from the preferred list, while retaining the definition parameters in a local storage.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of identifying at least one hidden network associated with an access point and at least one visible network associated with the access point, the method comprising:
   accessing, at an authorized user, an identifier of the access point in response to detecting said at least one visible network;
   providing, from the authorized user to a server, a request for a list of network identifiers of said at least one hidden network and said at least one visible network, said request including the access point identifier;
   selecting, using the list provided to the authorized user by the server in response to the request, one of said at least one hidden network and said at least one visible network to connect the authorized user to a wireless local area network;
   defining a single hidden network in a preferred list using the list provided to the authorized user by the server maintained by an operating system based on one or more definition parameters;
   treating said at least one of one or more hidden and visible networks as a group to allow at least one of said at least one of one or more hidden and visible networks in said group to be defined in the preferred list of said operating system; and
   upon selection of said at least one of said at least one of one or more hidden and visible networks in said group, automatically removing all other networks of said group from the preferred list of said operating system, while retaining one or more definition parameters of the removed networks in a local storage.

2. A method, as set forth in claim 1, wherein selecting one of said at least one hidden network and said at least one visible network to connect said authorized user further comprising:
   automatically selecting one of said at least one hidden network and said at least one visible network to connect said authorized user in a mobile environment including a multiplicity of access points that supports said at least one hidden network and said at least one visible network.

3. A method, as set forth in claim 1, wherein selecting said at least one hidden network and said at least one visible network to connect said authorized user to further comprising:
   in response to detecting said at least one hidden network and said at least one visible network, enabling said authorized user to manually select said at least one hidden network and said at least one visible network to connect said authorized user in a mobile environment including a multiplicity of access points that supports said at least one hidden network and said at least one visible.

4. A method, as set forth in claim 1, wherein selecting said at least one hidden network and said at least one visible network further comprising:
   upon detecting said at least one hidden network and said at least one visible network, identifying an identifier of said access point; and requesting a server associated with a central entity including a network operator or a service provider to provide information about said access point based on said identifier of said access point.

5. A method, as set forth in claim 1, further comprising:
determining whether or not a network from another access point is in a range of a client device, and an identifier that said another access point broadcasts is equal to one of the networks in said group; and
if so, excluding said identifier of said another access point from the preferred list of said operating system.

6. A method, as set forth in claim 5, further comprising:
combining all grouped networks of a multiplicity of access points that supports said Wi-Fi network and said first visible network and visible in a mobile environment to assure that no network other than the one to be selected is defined in the preferred list of said operating system.

7. A method, as set forth in claim 1, further comprising:
enabling said authorized user to retrieve information about said network.

8. A method, as set forth in claim 1, further comprising:
using a local server on said wireless local area network with a public visible service set identifier to obtain provisioning information.

9. A method, as set forth in claim 1, further comprising:
using an automatically discovered server to obtain provisioning information.

10. A method, as set forth in claim 1, further comprising:
using at least one of a local server on said wireless local area network with a public visible service set identifier and an automatically discovered server at said access point besides a central server to obtain provisioning information.

11. A method, as set forth in claim 1, further comprising:
automatically retrieving information in a mobile environment, for said Wi-Fi network, on all of visible access points of a multiplicity of access points within a range without informing said authorized user of a client software about organization or configuration of said network or said access point in advance; and
distributing one or more configuration updates for said network or said access point.

12. A method, as set forth in claim 11, further comprising:
defining a group of networks belonging to said access point.

13. A method, as set forth in claim 12, further comprising:
combining one or more groups of said multiplicity of access points in the vicinity of said client software; and
selecting one of said at least one hidden network and said at least one visible network without using additional knowledge of said authorized user.

14. A method, as set forth in claim 1, further comprising:
allowing one or more network administrators to reorganize infrastructure associated with said at least one hidden network and said at least one visible network as desired.

15. A method, as set forth in claim 1, further comprising:
allowing said authorized user or said client software to detect and select one of said at least one hidden network and said at least one visible network, regardless of organization of said at least one of one or more hidden and visible networks in the vicinity of said client software.

\* \* \* \* \*

UNITED STATES PATENT AND TRADEMARK OFFICE
CERTIFICATE OF CORRECTION

PATENT NO. : 7,647,048 B2  Page 1 of 1
APPLICATION NO. : 11/095059
DATED : January 12, 2010
INVENTOR(S) : Brok et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1252 days.

Signed and Sealed this

Twenty-eighth Day of December, 2010

David J. Kappos
*Director of the United States Patent and Trademark Office*